(12) United States Patent
Goegler et al.

(10) Patent No.: US 11,061,216 B2
(45) Date of Patent: Jul. 13, 2021

(54) MICROSCOPE AND METHOD FOR MICROSCOPIC IMAGING OF AN OBJECT

(71) Applicant: Carl Zeiss Microscopy GmbH, Jena (DE)

(72) Inventors: Michael Goegler, Wolfratshausen (DE); Thomas Ohrt, Golmsdorf (DE); Markus Sticker, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 0 days.

(21) Appl. No.: 16/495,748

(22) PCT Filed: Mar. 14, 2018

(86) PCT No.: PCT/EP2018/056434
§ 371 (c)(1),
(2) Date: Sep. 19, 2019

(87) PCT Pub. No.: WO2018/172161
PCT Pub. Date: Sep. 27, 2018

(65) Prior Publication Data
US 2020/0110254 A1 Apr. 9, 2020

(30) Foreign Application Priority Data
Mar. 20, 2017 (DE) .......................... 102017105928.8

(51) Int. Cl.
*G02B 21/36* (2006.01)
*G02B 21/14* (2006.01)
(Continued)

(52) U.S. Cl.
CPC ........... *G02B 21/365* (2013.01); *G02B 21/02* (2013.01); *G02B 21/14* (2013.01); *G02B 27/0025* (2013.01)

(58) Field of Classification Search
CPC .............................. G02B 21/365; G02B 21/14
See application file for complete search history.

(56) References Cited

U.S. PATENT DOCUMENTS 6,473,228 B1 10/2002 Toshimitsu
7,825,360 B2 11/2010 Karasawa et al.
(Continued)

FOREIGN PATENT DOCUMENTS

DE 11 2012 005 960 T5 11/2014
DE 10 2014 002 584 A1 7/2015
(Continued)

OTHER PUBLICATIONS

Humphry, "Optical transmission mode imaging with the Phase Focus Virtual Lens®," *Phase Focus Limited*, Technical Brief No. TB02, 4 pages (Mar. 22, 2010).
(Continued)

*Primary Examiner* — Rowina J Cattungal
(74) *Attorney, Agent, or Firm* — Christensen, Fonder, Dardi & Herbert PLLC (57) ABSTRACT

A microscope for imaging an object, comprising a lens assembly, which defines an optical axis and a focal plane perpendicular thereto, and correction optics, which are adjustable for adjustment to a depth position and which correct a spherical aberration on the lens assembly which occurs during imaging of the object at a specific depth position of the focal plane. The microscope may be used to determine a phase difference of radiation from a first lateral region and a second lateral region of the object, and to use a previously known connection between the phase difference and a modification of the spherical aberration caused thereby in order to determine an adjustment value of the correction optics, such that the spherical aberration is reduced when imaging the second region.

16 Claims, 3 Drawing Sheets

(51) Int. Cl.
*G02B 21/02* (2006.01)
*G02B 27/00* (2006.01)

(56) References Cited

U.S. PATENT DOCUMENTS

| | | | |
|---|---|---|---|
| 7,948,632 B2 | 5/2011 | Gustafsson et al. | |
| 8,848,199 B2 | 9/2014 | Choi et al. | |
| 10,634,623 B2 * | 4/2020 | Zhang | G01N 21/95623 |
| 2002/0075458 A1 * | 6/2002 | Matsuura | G02B 27/0025 353/69 |
| 2005/0024718 A1 | 2/2005 | Sase et al. | |
| 2008/0310016 A1 | 12/2008 | Karasawa et al. | |
| 2011/0133084 A1 * | 6/2011 | Nagaoki | H01J 37/26 250/311 |
| 2011/0141260 A1 | 6/2011 | Ouchi et al. | |
| 2011/0193269 A1 * | 8/2011 | Ito | G02B 21/361 264/400 |
| 2013/0130307 A1 * | 5/2013 | Sugiyama | G06K 9/00147 435/34 |
| 2014/0233094 A1 | 8/2014 | Ue et al. | |
| 2014/0368904 A1 | 12/2014 | Moertelmaier et al. | |
| 2015/0338639 A1 * | 11/2015 | Matsumoto | G02B 21/082 359/279 |
| 2015/0380211 A1 * | 12/2015 | Van Dyck | H01J 37/26 250/307 |
| 2017/0336326 A1 * | 11/2017 | Sirat | G01N 21/636 |

FOREIGN PATENT DOCUMENTS

| | | | | |
|---|---|---|---|---|
| DE | 102014002584 A1 * | 7/2015 | | G02B 21/0056 |
| EP | 1 988 417 B1 | 12/2012 | | |
| JP | 2005-043624 A | 2/2005 | | |
| JP | WO 2009/096522 A1 | 8/2009 | | |
| WO | WO 2013/130077 A1 | 9/2013 | | |

OTHER PUBLICATIONS

Kner, P., et al., "High-resolution wide-field microscopy with adaptive optics for spherical aberration correction and motionless focusing," *J. Micrsc.*, vol. 237, No. 2, pp. 136-147 (Feb. 2010).
Leica Microsystems CMS GmbH, Flyer "Leica motCORR™ Objectives," Order No. English 1593102140, 4 pages (2012).
Marquet, Pierre, et al., "Review of quantitative phase digital holographic microscopy: promising novel imaging technique to resolve neuronal network activity and identify cellular biomarkers of psychiatric disorders," *Neurophotonics*, vol. 1, No. 2, pp. 020901-1-020901-15 (Oct.-Dec. 2014).
Olympus Europa Holding GMBH, Flyer "Fluorescence and CLSM, FSX100 and FluoView FV10i, All-in-One Box Microscopes," 20 pages (Apr. 2010).
Phasics, S.A., phase contrast camera SID4bio, 6 pages.
Rappaz, Benjamin, et al., "Simultaneous cell morphometry and refractive index measurement with dual-wavelength digital holographic microscopy and dye-enhanced dispersion of perfusion medium," *Optics Letters*, vol. 33, No. 7, pp. 744-746 (Apr. 1, 2008).
Schwertner, M., et al., "Simple optimization procedure for objective lens correction collar setting," *Journal of Microscopy*, vol. 217, Pt 3, pp. 184-187 (Mar. 2005).
Tian, Lei, et al., "Quantitative differential phase contrast imaging in an LED array microscope," *Optics Express*, vol. 23, No. 9, pp. 11394-11403 (May 4, 2015).
Wang, Zhuo, et al., "Spatial light interference tomography (SLIT)," *Optics Express*, vol. 19, No. 21, pp. 19907-19918 (Oct. 10, 2011).
Yoo, H.W., et al., "Automated spherical aberration correction in scanning confocal microscopy," *Review of Scientific Instruments*, vol. 85, pp. 123706-1-123706-9 (2014).

* cited by examiner

MICROSCOPE AND METHOD FOR MICROSCOPIC IMAGING OF AN OBJECT

PRIORITY CLAIM

The present application is a National Phase entry of PCT Application No. PCT/EP2018/056434, filed Mar. 14, 2018, which claims priority from German Patent Application 10 2017 105 928.8, filed Mar. 20, 2017, the disclosures of which are hereby incorporated by reference herein in their entirety.

FIELD OF THE INVENTION

The invention relates to a method for microscopic imaging of an object by means of a microscope comprising an objective including a correction optical unit. The objective defines an optical axis and a focal plane perpendicular thereto. The correction optical unit of this objective is adjustable to a depth position to correct a spherical aberration occurring when imaging the object at this depth position of the focal plane. Further, the invention relates to such microscope.

BACKGROUND OF THE INVENTION

Microscopes often need to have a high degree of flexibility in research since very different types of experiments are carried out. Here, there may be great variation both in the objects to be observed and in the object carriers. In the case of objectives with a high numerical aperture, deviations of the refractive index along an optical path from the focal plane in the object to the objective have a strong influence on the diffraction-limited imaging capability. One option for adapting the spherical aberration associated with imaging the object to different object carrier thicknesses, such as, e.g., coverslip thicknesses from 0.15 mm to 1.5 mm, lies in setting a correction ring at the objective to the appropriate value and consequently reducing the spherical aberration during the imaging.

Such imaging aberrations become ever more noticeable, the deeper a focal plane lies in the object. Visible spherical aberrations already occur at depths of a few micrometers if there is a refractive index difference in the object and the numerical aperture of the objective is correspondingly high (e.g., a numerical aperture of 1.2, as is conventional in confocal microscopy). Imaging in three dimensions, i.e., imaging in thicker or deeper objects, is becoming ever more important, whether in the case of examining cell cultures in 3D, in the case of spheroids or in the case of thicker slices. Excellent imaging quality is becoming ever more important for this, and so losses in the quality on account of spherical aberration are no longer accepted.

The applications, particularly in the case of fluorescence microscopy, and hence the requirement on the microscope vary greatly. By way of example, in one experiment, it may be necessary only to observe the first 10 μm from a coverslip surface, while, in another experiment, however, the intention is to image into the object to a depth of 200 μm. Similar considerations apply to the temperature. One experiment is carried out at room temperature, while another experiment is performed at 37° C. This has an influence on the optical behavior of the microscope, and hence on the imaging properties thereof.

Until now, it has been cumbersome to exactly set the correction optical unit, which usually is a so-called correction ring at the objective matching the requirements of the object carrier or of the object. The experimenter must try different settings in order to find the optimal value. Moreover, changing the setting during the experiment is virtually precluded.

Prior art discloses various methods or designs for microscopes, which operate either in an automated or in a partly automated fashion and contain an iterative procedure for correcting spherical aberration. US 2008/310016 A describes correction of spherical aberration in respect of a thickness of a coverslip. US 2005/024718 A and JP 2005/043624 A2 require the user to enter optical parameters, from which a correction of spherical aberration is subsequently derived. US 2011/141260 A and US 2014/233094 A describe iterative correction methods for spherical aberration which evaluate the contrast or the brightness in an image analysis.

Phase aspects in microscopy are discussed in Humphry: "Optical transmission mode imaging with the Phase Focus Virtual Lens", Phase Focus Limited, No. TB02, Mar. 22, 2010; in the phase contrast camera "SID4bio" by Phasics S.A.; in Marquet et al.: "Review of quantitative phase-digital holographic microscopy: promising novel imaging technique to resolve neuronal network activity and identify cellular biomarkers of psychiatric disorders", Neurophotonics, Vol. 1(2), October-December 2014 and in Rappaz et al.: "Simultaneous cell morphometry and refractive index measurement with dual-wavelength digital holographic microscopy and dye-enhanced dispersion of perfusion medium", Optics Letters, Vol. 33, No. 7, Apr. 1, 2008.

For the purposes of improving the imaging quality, DE 102014002584 A1 ascertains a geometric path length position of an object point with much outlay by way of optical coherence tomography. WO 2013/130077 uses SLMs for illumination and imaging.

SUMMARY OF THE INVENTION

It is an object of the invention to provide a method and a microscope for imaging an object, by means of which the object can be imaged as aberration-free as possible with little outlay.

In a method for imaging an object, use is made of a microscope which comprises an objective and an adjustable correction optical unit. The objective defines an optical axis and a focal plane perpendicular thereto. The correction unit corrects a spherical aberration at the objective, said spherical aberration occurring when imaging the object. A set value of the correction unit applies to one certain depth position of the focal plane. The method comprises the following steps: illuminating the object; capturing radiation reflected or transmitted by the object; performing quantitative phase contrast imaging for determining a phase difference of radiation between a first lateral region and a second lateral region of the object. Either spherical aberration of imaging of the object or the spherical aberration correction necessary is known for the first region. A relationship between phase difference and a change in spherical aberration caused by this phase difference is used to ascertain a set value of the correction optical unit such that the spherical aberration is reduced in the second region, too. The correction optical unit is set to the set value and the object in the second region is imaged, then.

Absolute values of the spherical aberration need not be known in the method. The method relates to a first region, for which the spherical aberration is corrected or correctable by the correction optical unit. By way of reference to this first region and by ascertaining the phase difference and by using the relationship between the phase difference and the change in the spherical aberration caused thereby, the correction optical unit can very easily be set such that the object is imaged with as little spherical aberration as possible in the second region, too. In embodiments, the correction optical unit is first set in such a way that the first region is imaged with as little spherical aberration as possible. By way of example, a region of the object that is known in terms of its refractive index or an easily accessible region of a sample can be used to this end. Consequently, the first region can be selected in such a way that an image with little spherical aberration or with completely compensated spherical aberration is obtained with little outlay and quickly. Then, without further outlay, the method supplies a low-aberration or aberration-free image of the second region, too, by virtue of the phase contrast imaging being performed first and the appropriate setting for the correction optical unit then being obtained for the second region, taking into account the relationship between the change in the spherical aberration and phase contrast. Consequently, the combination of phase contrast imaging and use of a relationship reproducing the change in the spherical aberration allows a particularly simple procedure. In a particularly preferred embodiment, the relationship specifies a setting of the correction optical unit as a function of the phase contrast, more particularly the change in the setting. Thus, the change in the spherical aberration is directly converted into a setting of the correction optical unit.

The phase difference is determined by using quantitative phase contrast imaging. A device for quantitative phase contrast imaging optionally comprises a light source and a detector for determining the phase difference. Determining the phase difference in this way is equally possible in reflected light and in transmitted light microscopy methods.

A microscope for imaging an object comprises an objective, an adjustable correction optical unit, a drive, a device for quantitative phase contrast imaging and a control device. The objective defines an optical axis and a focal plane perpendicular thereto. The correction optical unit corrects a spherical aberration at the objective, said spherical aberration occurring during the imaging of the object. A set value of the correction optical unit applies to one certain depth position of the focal plane. The drive sets the correction optical unit. The device for quantitative phase contrast imaging is embodied to illuminate the object with radiation, to capture the radiation reflected or transmitted by the object and to determine a phase difference of radiation between a first lateral region and a second lateral region. Pre-stored in the control device is a relationship between the phase difference and a change in the spherical aberration caused thereby. On the basis of this relationship, the control device controls the drive in such a way that the spherical aberration in the focal plane is reduced also in the second region.

As a result of the present invention, spherical aberration present when imaging the object is automatically corrected for a "fresh" second region based on a "known" first region. In embodiments, this is done by evaluating a phase difference between two lateral regions in the object before or during the imaging of the object and by obtaining of a correction of the spherical aberration for the second region. Accordingly, the experimenter need not consider whether the correction optical unit is acceptably set to correct spherical aberration for the second region of the respective object. Moreover, it is now possible to be able to suitably set the correction optical unit, even during an experiment, for objects that have different refractive indices along their lateral extent and consequently cause different spherical aberrations. By way of example, the correction optical unit can be set according to the lateral region in which scanning is currently carried out during scanning imaging of the object, and so the spherical aberration is minimized for the overall imaging.

A further advantage is that determining the phase difference by quantitative phase contrast imaging causes little or no damage to the object since the radiation used to this end does not interact with the object, or only interacts weakly therewith.

By way of example, the method can be carried out with the aid of the control device of the microscope. By way of example, the control device can be embodied as a microprocessor, an electric circuit, a computer or any other programmable apparatus.

The microscope used for the method can carry out different imaging methods, depending on embodiment. By way of example, the microscope may be embodied for wide-field imaging and/or for scanning imaging techniques, such as confocal microscopy. Further, it is optionally possible to use the microscope to capture fluorescence images of the object.

The object optionally comprises the sample that, in fact, should be imaged and a mounting medium, that surrounds the sample, or the embedding medium. By way of example, the object comprises a cell culture to be imaged as a sample and the solution in which the cell culture is embedded as a medium.

The objective serves to image the object, but can be also used for illumination purposes at the same time. The objective has an optical axis. The focal length sets the depth position of the focal plane. Optionally, the objective and/or an object carrier are provided with a z-drive, and set the position of the focal plane in the object. The z-drive may be connected to the control device such that the control device is able to set the depth position of the focal plane. Moreover, the control device optionally captures the current position of the focal plane, for example with the aid of the position adopted by the z-drive.

The correction optical unit serves to correct the spherical aberration which occurs during the imaging of the object. The correction optical unit may be the above-described correction ring at the objective; however, it is also possible that optical elements at a distance from the objective are used, said optical elements facilitating the modification of the spherical aberration of the imaging by means of the objective. By way of example, the correction optical unit can be arranged on the detector side. The correction optical unit may comprise optical elements which deflect radiation differently depending on their position in relation to the optical axis.

The correction optical unit is set with the aid of a drive which is connected to the control device, either by lines or in a wireless manner. The control device may capture the position of the drive and thus the current set value of the correction optical unit.

The phase difference caused by the radiation passing through the object from the first region and the second region is proportional to an optical path length difference which the radiation from the first region and from the second region travels to the detector in each case. This optical path length difference is responsible for the spherical aberration. The phase difference satisfies following equation (1):

$$\Delta\varphi = \frac{2\pi}{\lambda}(n_2 - n_1)d$$

Here, $\Delta\varphi$ is the phase difference, $\lambda$ is the wavelength of the radiation for determining the phase difference, n2 is the refractive index in the second region, n1 is the refractive index in the first region and d is a path length. A path length difference, which emerges from equation (1) but without the prefactor $2\pi/\lambda$, is analogous to the phase difference $\Delta\varphi$. The path length d is the region, e.g., the thickness of the sample, from which radiation contributes to the imaging. The thickness, or the refractive index of the sample can be determined from the phase difference measurement using the equation specified above. The sample thickness can be derived from the phase data if the refractive index is constant and known. The refractive index can be derived if the thickness is known (and constant). The depth of field range of the objective is relevant for this purpose in some embodiments, specifically when, inter alia, the sample is very much thicker than the depth of field range. In other embodiments, in which the sample is thinner than the depth of field range and lies completely in the depth of field range, the sample thickness is decisive for the path length d. If wavelength and path length d are constant, the phase difference only depends on the difference in the refractive indices between the first region and the second region.

The relationship links the difference between the refractive index and a spherical aberration caused thereby with the phase difference or the optical path length difference. The relationship can be a formula or a table. The relationship is optionally determined once by determining very different refractive indices for the object and stored as a table; this calibration can also be regularly repeated for the microscope. The very different values of the phase difference can be ascertained to very good approximation by way of interpolation.

In embodiments, the path length d is included as a constant factor in the relationship. Therefore, a specification about this (constant) path length d is used in embodiments for the purposes of performing the microscopy method or in the microscope. This specification can be obtained differently for various embodiments. In some embodiments, the path length d equals the sample thickness if the depth of field range of the employed objective is greater than the sample thickness and the sample thickness lies completely in the depth of field range. In other embodiments, in which the conditions are virtually inverted and the sample is very much thicker than the depth of field range, this does not apply. However, the sample thickness varies over the object field in such embodiments. By way of example, the thickness d can be defined in the case of histological sections or by the dimensions of a microfluidic channel, or else be determined by other methods. Here, it is possible to ascertain a "mean" refractive index of the sample, for example with a low-magnification objective, and then subsequently use this parameter for correcting the spherical aberration in the case of a fluorescence measurement with a high-resolution objective. Additionally, the depth of field range can be approximately assumed as value for d.

In embodiments, it is also possible to perform a phase difference or path length difference measurement in the microscope at an interface between a biological sample to be examined by microscopy and a medium, for example a culture medium, surrounding the latter. Phase difference measurements or path length difference measurements are known in microscopy (see the publications specified below) and it poses no problem to a person skilled in the art to configure a microscope for such measurement. Here, the phase difference between the sample and the surrounding medium is ascertained for the purposes of determining the path length d (ascertaining the path length difference is equivalent thereto). Two measurements are carried out, in which the phase difference (or path length difference) differs in that the refractive index of the surrounding medium is different. In a first variant, this is implemented by virtue of the surrounding medium being dispersive, i.e., exhibiting a wavelength dependence on the refractive index, and the two measurements being carried out at different wavelengths. In a second variant, the medium is replaced by a medium with a different refractive index between the two measurements. The path length difference (or phase difference) emerges from the product of path length d and refractive index difference between medium and sample in each of the two measurements in both variants. Consequently, two equations with two unknowns are obtained; this system of equations is solvable without problems and it is possible to ascertain both the path length difference and the refractive index (unknown a priori) of the sample. Knowledge of the path length d now renders it possible, without interpolation, to use or determine, to a very good approximation, the various values of the phase difference, even outside of the interface between sample and medium used for ascertaining d.

On account of the relationship, the control device ascertains a set value for appropriately setting the correction optical unit. The set value optionally depends on the current position of the correction optical unit and the desired position ascertained from the relationship. By way of example, the current set value of the correction optical unit is known from knowledge of the spherical aberration in the first region. Further, the set value may also specify an absolute position of the correction optical unit. The object is imaged in the second region after setting the correction optical unit.

In one development, it is preferable for the relationship to be modified in respect of a penetration depth. The penetration depth is the depth at which the focal plane lies under the sample surface, as seen in the imaging direction. It is particularly relevant when a high penetration depth is used and the depth of field range of the objective is low (high numerical aperture), since the spherical aberration increases with penetration depth. Therefore, measuring the penetration depth is preferred, wherein measuring the penetration depth optionally comprises detecting an interface between an object carrier and the object and capturing a position of the focal plane. In embodiments, the penetration depth is relevant for the path of the radiation from the interface to the objective. Various options are conceivable for determining the penetration depth. By way of example, if the distance between the object carrier and the objective and the focal length of the objective are known, the penetration depth can be ascertained from this difference. Moreover, it is possible to determine the penetration depth on the basis of the object. Particularly preferably, however, the interface between the object and the object carrier is determined, for example by virtue of capturing the reflection of the radiation caused at the interface if the focal plane of the objective coincides with the interface. Since the control device can preferably capture the focal length of the objective by way of the z-drive, the position of the interface is detectable. Then, the penetration depth is captured by virtue of the adjustment of the focal length of the objective being recorded by means of the z-drive and the current focal plane consequently being known. Then, the penetration depth is the difference between the current focal plane and the interface. It is further possible to obtain a tomographic phase image, for example by virtue of the phase differences being measured in different z-planes (focal planes). Consequently, an xyz-phase relationship of the sample is obtained. From this, a z-averaged refractive index can now be determined for each penetration depth. By way of example, if the intention is to carry out a fluorescence measurement at a penetration depth of 20 µm, the refractive indices over the first 20 µm can be averaged and included in the correction of the spherical aberration. If one is situated 100 µm deep within the sample, it is necessary to average over 100 µm.

If the object is imaged at different depth positions, it is preferable for a plurality of phase differences to be determined in a plurality of object planes that are spaced apart from one another. By way of example, a thick sample is captured in a plurality of z-positions by way of a so-called z-stack. Recording the phase differences in a plurality of object planes, i.e., by way of a z-stack, is particularly helpful if the precise positions of the focal planes for imaging the object are not yet known when determining the set values. However, it is also possible for the phase difference to be measured first for each focal plane to be imaged in the object, for the spherical aberrations then to be corrected and for this focal plane to be subsequently imaged. Subsequently, the focal plane is displaced, the phase difference is measured anew, the spherical aberration is corrected where necessary and, following this, the object is imaged in the modified focal plane.

In embodiments, a holographic quantitative phase contrast imaging method known as digital holographic microscopy is used for determining the phase difference. Coherent or partly coherent radiation can be used for the phase contrast imaging. Further, it is possible to use at least two wavelengths for the quantitative phase contrast imaging, the object, more particularly the medium, having a significant refractive index difference, which is known in advance, at said wavelengths. The quantitative phase contrast imaging optionally is a ptychographic method. A wavefront sensor is used for the quantitative phase contrast imaging in a development of the microscope. Additionally, an interferometric structure can be used for the quantitative phase contrast imaging. The light source for the quantitative phase contrast imaging may comprise a spatial light modulator or the phase of the radiation used for the quantitative phase contrast imaging is optionally varied. Further, the radiation for the quantitative phase contrast imaging can be produced from various illumination angles. Examples for a device for quantitative phase contrast imaging or methods carried out therewith are described in U.S. Pat. No. 7,948,632 B2, Wang et al.: "Spatial light interference tomography (SLIT)", Optics Express, Vol. 19, No. 21, Oct. 10, 2011, and Tian et al.: "Quantitative differential phase contrast imaging in an LED array microscope", Optics Express, Vol. 23, No. 9, May 4, 2015.

As already mentioned, the phase difference caused by the object is measured between two lateral regions that are spaced apart from one another in an object plane. The object plane is identical to the focal plane or parallel thereto. Correcting the spherical aberration becomes ever more precise the closer the object plane lies to the focal plane for imaging the object. By way of example, determining the phase difference and subsequent imaging of the object are carried out by the same objective, with the object plane lying in the focal plane. However, it is also possible for the phase difference to be determined once in a certain object plane and for the object to be subsequently imaged in different focal planes. Nevertheless, determining the phase difference once in an object plane represents a very good approximation for the phase difference in the focal plane. The lateral regions between which the phase difference is determined can be approximately punctiform, particularly if the microscope carries out a scanning imaging method. If an imaging method is used for quantitative phase contrast imaging, it is possible to simultaneously capture not only two lateral regions but a plurality of lateral regions.

In embodiments, the first region is chosen in such a way that the spherical aberration thereof is known or compensated. By way of example, this comprises the spherical aberration for imaging the object from the focal plane in the first region already having been minimized. By way of example, this is the case if the correction optical unit is set for a region of the object with a certain refractive index as a standard value; this can, inter alia, be implemented automatically. By way of example, such a standard value may be suitable for water or an aqueous solution, which surrounds samples to be imaged, such as a cell or any other biological samples. Knowledge of the setting for compensating the spherical aberration in the first region optionally comprises knowledge about the set value for the correction optical unit, for which the spherical aberration is minimized, for example. In order to ascertain the first region, the object is optionally initially imaged without a further correction of the spherical aberration in order to identify where regions with known refractive index are present. Further, the spherical aberration may be corrected manually—also with the aid of the control device and the drive—until the imaging of the object is optimal in the first region. Moreover, the first region may also be such a region in which the sample to be imaged is not present in the object and the first region is then measured for air. Consequently, the object optionally comprises the sample to be imaged and also the surroundings thereof.

In particular, the second region is the region of the object that is of interest for the examination to be carried out. As a rule, the second region has a refractive index that differs from the refractive index in the first region because otherwise there would be no need for correcting the spherical aberration. Usually, the refractive index in the second region is unknown, and so purely determining the phase difference between the first region and the second region helps to optimize the spherical aberration for imaging the entire object.

In order to simplify and/or accelerate the correction of spherical aberration, one development prefers for a third lateral region of the object to be used, for which the same refractive index, within a tolerance range, is present as for the second region, wherein the set value for the second region is also used for imaging the third region. By way of example, the third lateral region can be a region in the focal plane of the object, for which it is expected that the refractive index is virtually identical to the refractive index in the second region. By way of example, the second region and the third region may be within a cell such that the refractive index for both regions, and hence also the spherical aberration for the imaging thereof, are approximately the same. By way of example, the refractive indices of the various relevant sample regions can be averaged in order to correct a spherical aberration for the sample region. Consequently, an acceptable correction of the spherical aberration can be provided with a reduced number of determining phase differences. Further, this also allows increase in the measurement speed for imaging the object since a time-consuming adjustment of the correction optical unit is dispensed with during the imaging of the object if the same set value is used for the third region as for the second region. A similar statement applies to z-stack recordings. If a sufficient number of similar phase difference values or refractive indices are obtained in the various z-planes (in comparison with the z-plane lying therebelow), the spherical aberration need not be corrected in each z-plane. A similar statement applies to the z-stack by z-stack ascertainment of the phase difference of an object. This means that if similar phase difference values or refractive indices are obtained in the various z-planes, the spherical aberration need not be corrected in each z-plane. Optionally, an additional correction is only carried out once a maximum deviation has been exceeded.

In order to design the relationship even more precisely and consequently facilitate an even more accurate correction of the spherical aberration, it is preferred in a development for at least one parameter to be captured, said parameter comprising a temperature of the object, a material of an object carrier, an object carrier thickness, an immersion medium for the objective or a wavelength of radiation for imaging the object, with the relationship being modified in respect of the at least one parameter. It is known that the refractive index of a material depends on its temperature. Consequently, the spherical aberration when imaging by means of the objective is also dependent on temperature. By capturing the temperature of the object, for example by means of a sensor or by way of an entry, for example if the temperature of the experiment is fixedly predetermined, it is possible for the relationship to be modified such that a different set value arises in the case of different temperatures. Consequently, the correction optical unit is set in a temperature-dependent manner. Here too, the relationship may be determined by calibration in respect of the temperature dependence. In a development, the temperature of the object is determined by capturing an energy parameter of radiation for illuminating the object and by ascertaining the temperature of the object from the energy parameter. By way of example, the energy parameter may be the intensity or the power of the illumination radiation. This may be ascertained in the object itself or by output coupling a measurement component of the illumination radiation from the illumination beam path. To this end, use can be made of a power detector or an intensity detector. The temperature in the object may be calculated on the basis of the energy parameter and the expected or known absorption of the illumination radiation by the object. The type of object may also be used for calculating the temperature, namely in respect of the strength of the absorption behavior of the respective object. In this way, the relationship can be automatically modified in respect of the temperature.

Along the path traveled by the radiation from focal plane to the objective, the radiation passes both an object carrier or coverslip and also, under certain circumstances, an immersion medium. These structures have a refractive index that contributes to the spherical aberration of the imaging of the object. By capturing an object carrier thickness or coverslip thickness and/or the refractive index of the object carrier and/or of the immersion medium, in each case by way of example by entering an associated specification, the relationship can be improved and modified in respect of the spherical aberration, which is changed by these aspects.

Since the spherical aberration depends on the refractive index, depends on the wavelength in the case of dispersive materials, the spherical aberration then is likewise wavelength-dependent. The wavelength of the radiation for imaging the object is consequently a further parameter in respect of which the relationship may be modified in order to improve the setting of the spherical aberration. The wavelength may be entered manually; the wavelength of the induced fluorescence radiation is known, particularly in the case of fluorescence imaging, to the controller and/or the user. Moreover, the microscope may be provided with a wavelength sensor, by means of which the wavelength of the imaging radiation can be determined in an automated manner. Optionally, the illumination wavelength and/or filter settings can be taken into account.

In a development, the method can be used to determine the refractive index of the object in the second region. This was already explained above with reference to equation (1). Consequently, this development renders it possible to determine the refractive index in the sample; by way of example, should the refractive index of an aqueous medium surrounding a cell culture be known, it is consequently possible to determine the refractive index in the cell culture itself. It can then be used to set the correction optical unit.

In order to protect the sample from radiation damage, it is preferable for the phase difference to be determined by means of quantitative phase contrast imaging, with the radiation for the quantitative phase contrast imaging optionally lying in the infrared range. Quantitative phase contrast imaging is known for causing little radiation damage in the object. This is particularly successful if infrared radiation is used. Further, the use of infrared radiation is advantageous in that an interaction with some fluoresced substances can be avoided within the scope of fluorescence imaging.

It goes without saying that the aforementioned features and those yet to be explained below can be used not only in the combinations specified but also in other combinations or on their own, without departing from the scope of the present invention.

BRIEF DESCRIPTION OF THE DRAWINGS

The invention is explained in even greater detail below for example with reference to the accompanying drawings, which also disclose features essential to the invention. In the figures.

DETAILED DESCRIPTION

A microscope 10 facilitates imaging of an object 12. The radiation reflected or transmitted by the object 12 is collected by an objective 14 and imaged on an imaging detector 16 by means of an imaging beam path 18. The objective 14, the imaging detector 16 and/or the imaging beam path 18 are arranged within the housing 20 of the microscope 10. The imaging beam path 18 may be embodied for various types of imaging of the object 12. By way of example, the object 12 can be recorded in the wide field or by means of a scanning imaging method. Further, the microscope 10 may be embodied for fluorescence measurements. Depending on the type of employed imaging, the imaging beam path 18 comprises various optical elements and/or further components, such as, e.g., a scanning device for deflecting radiation. These components are not illustrated in FIG. 1. The object 12 can be illuminated, for example with a reflected-light light source or with the transmitted-light light source 22 illustrated in FIG. 1. By way of example, the light source 22 may produce white light or emit radiation in a certain wavelength range suitable for fluorescence microscopy.

Figure 1:
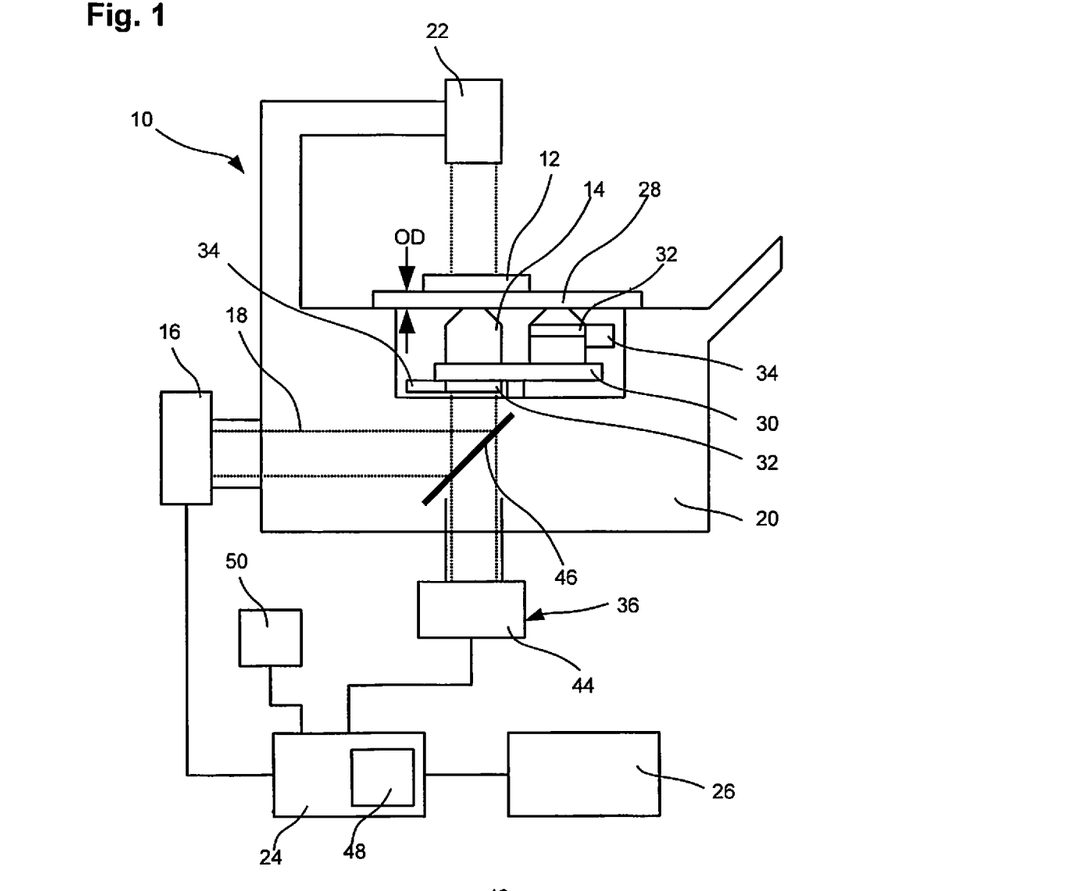
FIG. 1 shows a schematic view of the microscope.

The imaging detector 16 is embodied to convert an optical image of the object 12 produced thereon by means of the imaging beam path 18 into electrical signals, which are transmitted to a control device 24 via a line. From the electrical signals provided by the imaging detector 16, the control device 24 produces an electronic image which, for example, is displayed to the experimenter on a display device 26, such as a monitor, connected to the control device 24.

The object 12 is arranged on an object carrier 28 which has a certain object carrier thickness OD. By way of example, the object carrier 28 may be a glass plate. Further, the object carrier 28 may be the base of a Petri dish made of glass or plastic. The object carrier 28 can be mounted in movable fashion in relation to the housing 20 such that the object 12 is displaceably mounted in relation to the objective 14.

Figure 2:
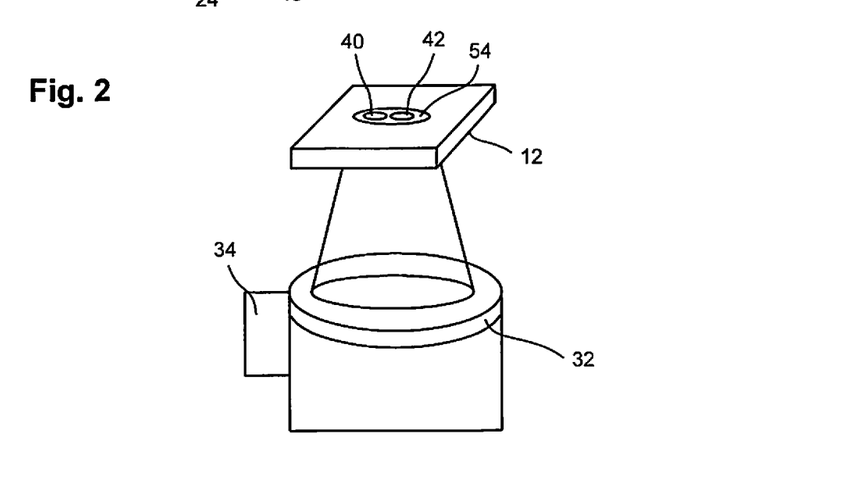
FIG. 2 shows an objective and an object carrier, with an object arranged thereon, of the microscope in FIG. 1.
Figure 3:
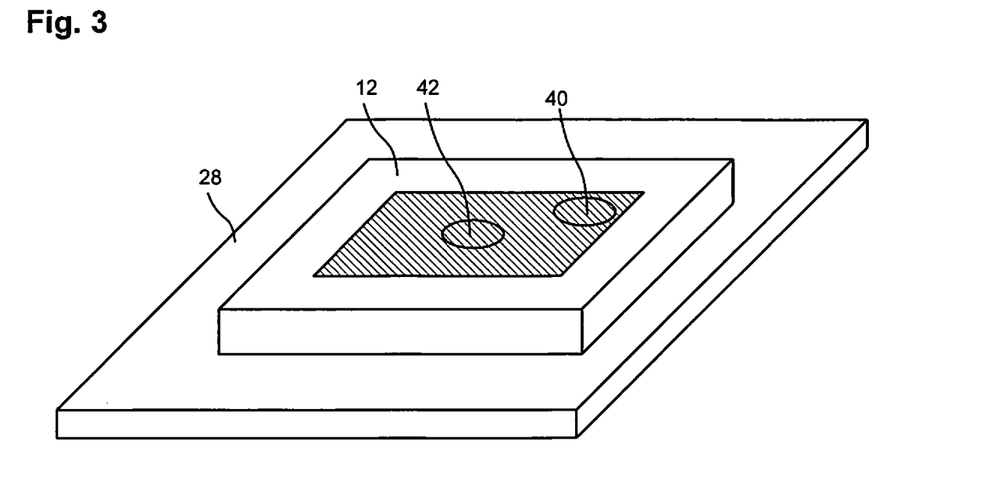
FIG. 3 shows a magnified illustration of an embodiment of the object carrier with the object.

Optionally, the microscope 10 comprises a plurality of objectives 14, which are arranged on a revolver 30. The revolver 30 can be used to pivot-in the objective 14 which is intended to be used for the imaging. The revolver 30 can be adjusted manually or be moved by a revolver drive connected to the control device 24. Neither the revolver drive nor the connection to the control device 24 are illustrated in FIG. 1. At least one of the objectives 14 is provided with a correction optical unit 32. The correction optical unit 32 is adjustable and serves to modify a spherical aberration of the imaging of the object 12. Depending on the depth position of a focal plane in the object, there is a change in the spherical aberration, and so the spherical aberration when imaging the object 12 may be minimized by an adjustment of the correction optical unit 32. The objective 14 illustrated on the right in FIG. 1 and the objective 14 illustrated in FIG. 2 comprise a correction ring as a correction optical unit 32. It is securely connected to the objective 14 and rotatable by way of a drive 34. The drive 34 is connected to the control device 24 by means of a line or via radio, with the connection not being illustrated in FIGS. 1 and 2. Consequently, the control device 24 is able to actuate the drive 34 and able to influence the spherical aberration of the imaging of the object 12. Optionally, the control device 24 may capture the current setting of the correction optical unit 32 by means of the drive 34.

Alternatively, the correction optical unit 32 can be arranged in a manner detached from the objective 14. In the objective 14 illustrated to the left in FIG. 1, the correction optical unit 32 is arranged in the imaging beam path 18. It, too, is provided with a drive 34.

Further, the microscope 10 comprises a device for quantitative phase contrast imaging 36. The device for quantitative phase contrast imaging 36 may comprise very different types, by means of which quantitative phase contrast imaging can be performed. By way of example, reference is made here to the methods described in the literature references mentioned further above.

The device for quantitative phase contrast imaging 36 is embodied to determine a phase difference between a first lateral region 40 and a second lateral region 42; as a rule, these lateral regions lie within a common object field 54 of the objective 14. This is illustrated, inter alia, in FIG. 2. The device for quantitative phase contrast imaging 36 comprises an optional illumination device and a phase detector or phase camera 44. By way of example, the illumination device produces white light or infrared light, which is imaged on the phase detector 44 by means of the objective 14 and the correction optical unit 32. In order to output couple radiation from the imaging beam path 18 to the phase detector 44 for the purposes of detecting the phase difference, provision is made of a beam splitter 46. The phase detector 44 detects the phase difference between radiation from the first region 40 and the second region 42. Preferably, the device for quantitative phase contrast imaging 36 is embodied to determine phase differences between the first region 40 and a plurality of second regions.

The control device 24 is connected to a storage device 48, in which a relationship between the phase difference and a change in the spherical aberration caused thereby is saved. This relationship may have been determined by a preceding calibration and represents, for example, a table. The storage device 48 can be embodied as part of the control device 24, which may comprise a microprocessor, computer or the like; the storage device 48 may be a writeable memory, such as a RAM (random access memory). The control device 24 calls the relationship from the storage device 48 and thus determines a set value for the correction optical unit 32, by means of which the spherical aberration for imaging the object 12 in the second region 42 is reduced. By way of example, the relationship may contain the change in the spherical aberration in the form of a setting of the correction optical unit, for example the correction ring. Here, this may be specifying a change. In particular, the relationship may have been ascertained by earlier experiments using a sample with a known refractive index distribution. Alternatively, it can be obtained by calculation from the structure of the correction optical unit. Then, the control device 24 actuates the drive 34 according to the set value such that the spherical aberration of the imaging of the object 12 in the second region 42 is reduced, preferably minimized or even completely compensated. Then, the object 12 is imaged in the second region 42.

Further, the microscope 10 comprises an interface 50, by means of which a plurality of parameters of the experiment can be entered and can consequently be made available to the control device 24. By way of example, the interface 50 is a keyboard or mouse, and it is connected to the control device 24.

Figure 4:
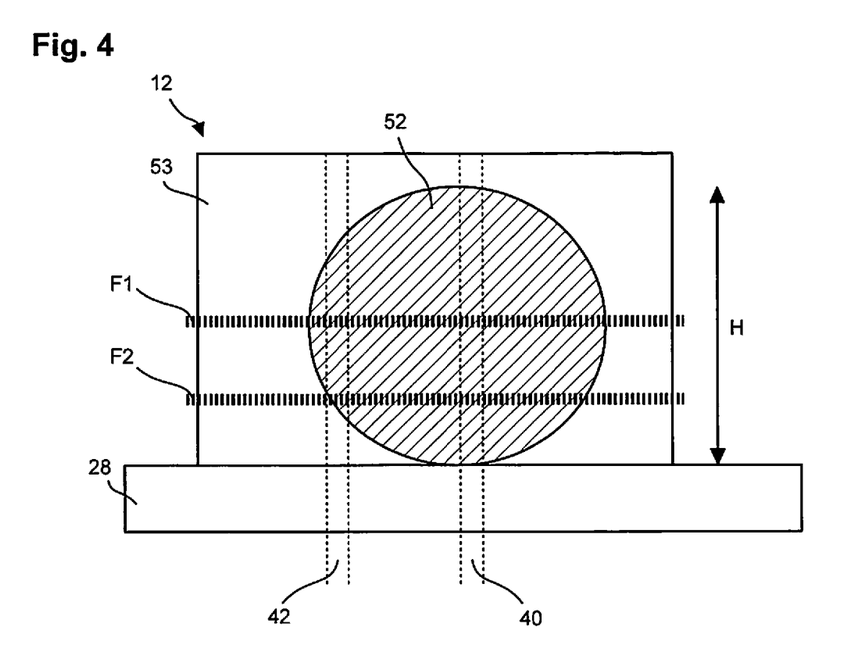
FIG. 4 shows a schematic illustration of the object.

FIG. 4 schematically shows the object 12, which consists of a biological sample 52 in an embedding medium 53 in this case. Further, the regions 40 and 42, in which the phase contrast measurement is implemented, are plotted schematically. F1 and F2 denote two different focal planes, on which the objective 14 can be set. The thickness of the dashed focal planes elucidates the depth of field range. If a homogeneous refractive index of the sample 52 is assumed, the goal is to carry out a different correction for the lateral region 40 than for the lateral region 41 if the focal plane F2 is present since the lateral region 40 there is completely filled by the sample and its refractive index; by contrast, the lateral region 42 is not. This situation may always occur when a sample 52 should be examined by microscopy, the height H of said sample being very much greater than the depth of field range and said sample moreover not having a constant thickness over its lateral extent. Therefore, provision is made in embodiments for the phase differences in different planes between objective and desired object plane, for example corresponding to F1, to be ascertained and for the interposed layers between the coverslip 28 and the actual focal plane F1 desired in the object, captured thereby, to be taken into account for the correction. If only the focal plane F1 is considered, it can be seen that no phase differences arise in the lateral regions 40 and 42 as a result of the geometry of the sample 52 (assuming a homogeneous refractive index of the sample 52). By contrast, a phase difference is obtained in the focal plane F2. Therefore, provision is made in embodiments for the geometry of the object 12, which, e.g., comprises a spherical sample 52 with a diameter of, e.g., 150 µm, to be taken into account and for a correction depending on the lateral position (40, 42) and the position of the focal planes (F1, F2) to be undertaken with knowledge and following calibration of the refractive index of the sample 52.

Figure 5:
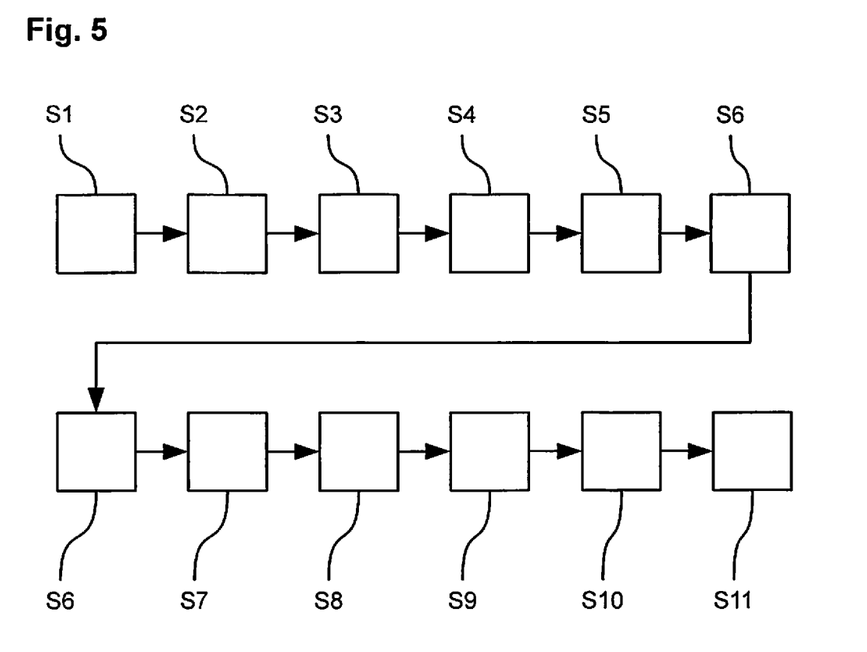
FIG. 5 shows a block diagram illustrating a method for imaging the object.

A method for imaging the object 12 is shown in a block diagram in FIG. 5. An object carrier thickness OD is entered, for example with the aid of the interface 50, in an optional step S1. The spherical aberration of the imaging of the object 12 in the first region 40 is optimized in a step S2. To this end, an appropriate algorithm is saved in the control device 24. This algorithm can use the refractive index in the first region 40 of the object 12. By way of example, the first region 40 is arranged in a section of the object 12 in which a known medium, e.g., water or an aqueous solution, is situated. By way of example, this can be the medium of a cell culture or any other biological sample. The refractive index of the medium is known. The correction optical unit 32 is automatically set for minimizing the spherical aberration in embodiments with the aid of the optional object carrier thickness OD and the refractive index of the object 12 in the first region 40. Alternatively, the optimization of the spherical aberration of the imaging of the object 12 in the first region 40 can be implemented manually, for example by adjusting the correction optical unit 32. However, according to these steps, this minimization only relates to aberration caused by the first region 40, i.e., the medium.

An object plane, in which a phase difference between the first region 40 and the second region 42 should be ascertained, is set in a step S3. This also sets a distance between the object plane and the object carrier 28. As a rule, the object plane coincides with the focal plane.

The second region 42 of the object is set in a step S4. This relates to the region that should subsequently be imaged by means of the microscope 10, i.e., for example, a sample situated in the medium. By way of example, to this end, the object 12 may be imaged with a non-corrected spherical aberration in an optionally preceding intermediate step in order to identify where the second region 42 of interest of the object 12 is situated.

The phase difference between the first region 40 and the second region 42 is recorded in a step S5. Optionally, the phase difference can be determined in a plurality of object planes that are spaced apart along the optical axis.

Additional parameters in respect of the object 12 are captured in an optional step S6. By way of example, these may be made available by means of an interface 50 of the control device 24. By way of example, the temperature of the object 12, the previously optionally entered object carrier thickness OD, a thickness of the object 12, a material of the object carrier 28 and/or the refractive index in the first region 40 or in the second region 42 are entered. By way of example, the temperature can be captured by way of a sensor not illustrated here or it may be known for the experiment, for example 37° C. By way of example, the thickness of the object 12 can be measured prior to the experiment or it is known, as is conventional, for example, in the case of objects 12 in the form of sections. The refractive index for the first region 40 may likewise be known, for example because this relates to an aqueous solution. Further, the refractive index of the object 12 may also be known in the second region 42. Moreover, a penetration depth, which specifies the distance between the focal plane and an interface of the object carrier 28, can also be measured in step S6. To this end, it is possible, for example, to adjust the depth position of the focal plane until a reflection becomes visible at the interface between the object carrier 28 and the object 12. As a result, the distance to the object carrier 28 is captured for a given depth position of the focal plane, and so the penetration depth is known. Further, the immersion medium between the objective 14 and the object carrier 28 can be taken into account as a parameter.

As already explained in the general part of the description above, the path length and/or the refractive index in the second region 42 is determined from the phase difference in an optional step S7.

Alternatively, the thickness of the sample, if it is less than a depth of field range of the objective, or the depth of field range dimension, optionally corrected by a correction factor, can be used instead of d if the sample completely covers the depth of field range. d can also be used to determine the refractive index of the object 12 in the second region 42. The set value can equally be ascertained on this basis.

In step S8, the set value for the correction optical unit 32 is ascertained on the basis of the relationship. The relationship can be modified by the penetration depth, which was established previously, such that the set value is even more precise. The relationship is modified in respect of the penetration depth if, in particular, the object plane in which the phase difference was determined does not coincide with the focal plane intended to be imaged. To this end, the determination of the refractive indices from different object planes below the focal plane (in the case of an inverted microscope) can be included inter alra, for example by way of averaging the refractive indices along the optical axis. Then, it is not only the refractive index in the focal plane that is taken into account, but also the information from further planes.

In a step S9, the correction optical unit 32 is set according to the adjustment value. As a result, the spherical aberration for imaging the object 12 is minimized in the second region 42. The object 12 is imaged in the second region 42 in a subsequent step S10.

The phase difference ascertained between the first region 40 and the second region 42 is also used as the phase difference between a third region and the first region 40 in an optional step S11. This is implemented, in particular, if the expectation is that the refractive index is identical or virtually the same for the second region 42 and the third region. Consequently, the object 12 can be imaged with corrected spherical aberration not only in the second region 42 but also in the third region in a subsequent imaging step. A similar statement applies to recordings in different focal planes, in which the refractive index difference (along the optical axis) is similar enough. By way of example, this may be set by way of a threshold.

The invention claimed is:

1. A method for microscopic imaging of an object, the method comprising the following steps:
providing a microscope comprising an objective which defines an optical axis and a focal plane perpendicular thereto, and which comprises a correction unit for correcting spherical aberration for one aberration corrected depth position of the focal plane, wherein the correction unit is adjustable to set the aberration corrected depth position of the focal plane;
illuminating the object;
capturing radiation reflected or transmitted by the object;
performing quantitative phase contrast imaging in a first lateral region and in a second lateral region of the object and determining a phase difference value between radiation from the first lateral region and from the second lateral region of the object;

providing a relationship between phase difference and change in spherical aberration;

determining a set value of the correction optical unit by utilizing the relationship and the phase difference value, and adjusting the correction optical unit to the set value and imaging the object in the second region.

2. The method as claimed in claim 1, wherein the performing step comprises using information on one of the following parameters for the first region of the object:

spherical aberration of imaging, refractive index of the object, and setting of the correction optical unit required to correct spherical aberration in the first region.

3. The method as claimed in claim 1, wherein the determining step comprises ascertaining a path length being an object depth region from which radiation from the object contributes to the imaging in the first or second region.

4. The method as claimed in claim 3, wherein the path length ascertaining step comprises varying an effective refractive index of the object in the first region and measuring the phase difference for at least two values of the refractive index of the object in the first region and determining the path length from the measured phase difference.

5. The method as claimed in claim 4, comprising varying the effective refractive index by using a dispersive medium in the first region and measuring the phase difference at two different wavelengths.

6. The method as claimed in claim 3, comprising using a thickness of the object as the path length.

7. The method as claimed in claim 1, wherein determining the phase difference value comprises determining a plurality of phase difference values in a plurality of object planes that are spaced apart from one another along the optical axis.

8. The method as claimed in claim 1, wherein further a third lateral region of the object is imaged, wherein the set value for the second region is also used for imaging the third region.

9. The method as claimed in claim 1, wherein at least one of the following parameter values is captured: a temperature of the object, a material of an object carrier, an object carrier thickness, an immersion medium utilized in imaging, and a wavelength of radiation used for imaging the object, wherein the step of providing the relationship includes modifying the relationship depending on the at least one parameter value.

10. The method as claimed in claim 1, wherein the quantitative phase contrast imaging step includes quantitative phase contrast imaging in the infrared spectral range.

11. The method as claimed in claim 1, wherein the set value is determined on a basis of the phase difference value in at least one first object plane and the object is imaged using the set value in another, second object plane.

12. A microscope for imaging an object, comprising:

an objective which defines an optical axis and a focal plane perpendicular thereto, and which comprises a correction unit for correcting spherical aberration for one aberration corrected depth position of the focal plane, wherein the correction unit is adjustable to set the aberration corrected depth position of the focal plane;

a drive which adjusts the correction optical unit regarding the aberration corrected depth position of the focal plane;

a quantitative phase contrast imaging device configured to illuminate the object, to capture radiation reflected or transmitted by the object and to determine a phase difference value between radiation from a first lateral region and from a second lateral region; and a control device configured to control the quantitative phase contrast imaging device and including a pre-stored relationship between phase difference and change in spherical aberration, wherein the control device is further configured:

to determine a set value of the correction optical unit from the relationship and the phase difference value such that the spherical aberration in the second region is reduced, to control the drive to adjust the correction optical unit to the set value, and to image the object in the second region.

13. The microscope as claimed in claim 12, wherein the quantitative phase contrast imaging device is configured to use information on one of the following parameters in the first region of the object: spherical aberration of imaging, refractive index of the object, and setting of the correction optical unit required to correct spherical aberration in the first region.

14. The microscope as claimed in claim 12, wherein the quantitative phase contrast imaging device is configured to determine a plurality of phase difference values in a plurality of object planes that are spaced apart from one another along the optical axis.

15. The microscope as claimed in claim 12, comprising a determining unit configured to capture at least one of the following parameter values: a temperature of the object, a material of an object carrier, an object carrier thickness, an immersion medium for the objective, and a wavelength of radiation utilized for imaging the object, wherein the relationship depends on the at least one of the parameter values.

16. The microscope as claimed in claim 12, wherein the quantitative phase contrast imaging device is configured for quantitative phase contrast imaging in the infrared spectral range.

* * * * *